United States Patent
Wu et al.

(10) Patent No.: US 6,764,738 B1
(45) Date of Patent: Jul. 20, 2004

(54) MAGNETIC RECORDING MEDIUM WITH PATTERNED SUBSTRATE

(75) Inventors: Zhong Wu, Fremont, CA (US); Rajiv Ranjan, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/242,226

(22) PCT Filed: Feb. 10, 1999

(86) PCT No.: PCT/US99/02670

§ 371 (c)(1),
(2), (4) Date: Feb. 10, 1999

(87) PCT Pub. No.: WO99/40575

PCT Pub. Date: Aug. 12, 1999

Related U.S. Application Data

(60) Provisional application No. 60/074,253, filed on Feb. 10, 1998.

(51) Int. Cl.$^7$ .............................. G11B 5/64; G11B 5/82

(52) U.S. Cl. ...................... 428/65.6; 428/141; 428/336; 428/694 SG; 428/694 T; 428/694 TS; 204/192.15; 204/192.16; 427/129

(58) Field of Search ............................... 428/141, 65.1, 428/336, 694 SG, 694 T, 694 TS; 204/192.15, 192.16; 427/129

(56) References Cited

U.S. PATENT DOCUMENTS

| | | | | |
|---|---|---|---|---|
| 4,109,287 A | * | 8/1978 | Kawai et al. | ................ 360/131 |
| 4,525,759 A | * | 6/1985 | Valayil et al. | ............... 360/135 |
| 4,548,682 A | * | 10/1985 | Yoshida et al. | ............. 205/119 |
| 4,925,738 A | * | 5/1990 | Tsuya et al. | ............. 428/472.2 |
| 5,035,960 A | * | 7/1991 | Kamigaki et al. | ..... 428/694 ST |
| 5,062,021 A | | 10/1991 | Ranjan et al. | |
| 5,166,006 A | | 11/1992 | Lal et al. | |
| 5,202,810 A | | 4/1993 | Nakamura et al. | |
| 5,470,636 A | | 11/1995 | Wakui et al. | |
| 5,586,040 A | * | 12/1996 | Baumgart et al. | .......... 700/166 |
| 5,981,018 A | * | 11/1999 | Lai et al. | ................... 428/65.5 |
| 6,248,416 B1 | * | 6/2001 | Lambeth et al. | ........... 428/65.3 |

* cited by examiner

Primary Examiner—Stevan A. Resan
(74) Attorney, Agent, or Firm—McDermott Will & Emery LLP

(57) ABSTRACT

Magnetic recording media exhibiting improved Hr, SNR and S*, suitable for high areal recording density, are obtained by forming a substantially uniform patterned Al or Al alloy layer on a non-magnetic substrate which is substantially replicated in subsequently applied layers to form a data zone. Embodiments include sputtering depositing an Al or Al alloy layer on the substrate and anodizing the sputtered layer to form a plurality of substantially uniform hexagonal cells comprising aluminum oxide. The hexagonal pattern is replicated in a subsequently deposited and epitaxially grown magnetic layer such that the magnetic grains are separated, thereby reducing magnetostatic interactions therebetween.

20 Claims, 4 Drawing Sheets

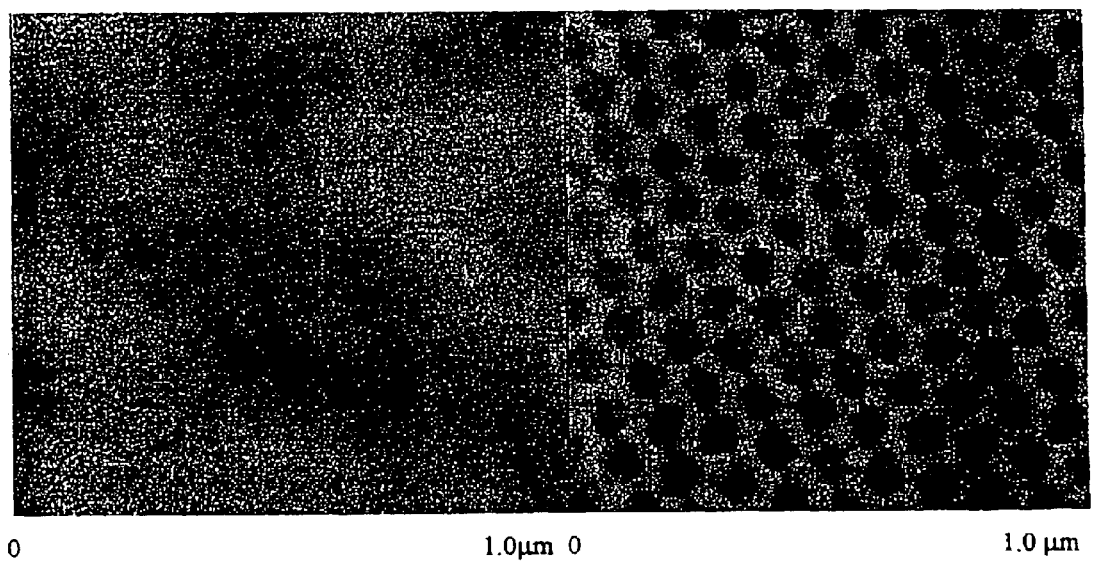
Fig. 3 AFM images of a NiP/Al substrarte before and after anodizing process.

MAGNETIC RECORDING MEDIUM WITH PATTERNED SUBSTRATE

RELATED APPLICATION

This application claims priority from provisional patent application Serial No. 60/074,253 filed, Feb. 10, 1998, entitled "PATTERN SUBSTRATE FOR HIGH COERCIVITY AND LOW NOISE MEDIA", the entire disclosure of which is hereby incorporated herein by reference.

TECHNICAL FIELD

The present invention related to the recording, storage and reading of magnetic data, particularly rotatable magnetic recording media, such as thin film magnetic disks having textured surfaces for contact with cooperating magnetic transducing heads. The invention has particular applicability to high density magnetic recording media exhibiting low noise, reduced flying heights and high coercivity.

BACKGROUND ART

Magnetic disks and disk drives are conventionally employed for storing data in magnetizable form. Typically, one or more disks are rotated on a central axis in combination with data transducing heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk. It is extremely difficult to produce a magnetic recording medium for ultra-high density recording having suitable magnetic properties, such as high coercivity, e.g., greater than 2500 Oersteads, and a high overwrite, e.g., about 40 dB, while at the same time exhibiting suitable mechanical properties for read-write performance, such as a small glide height avalanche, e.g., about 0.75 to about 0.85 $\mu$ inch.

In operation, the magnetic disk is normally driven by the contact start stop (CSS) method, wherein the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducing head is maintained at a controlled distance from the recording surface, supported on a bearing of air as the disk rotates. The magnetic head unit is arranged such that the head can be freely moved in both the circumferential and radial directions of the disk in this floating state allowing data to be recorded on and retrieved from the surface of the disk at a desired position.

Upon terminating operation of the disk drive, the rotational speed of the disk decreases and the head begins to slide against the surface of the disk again and eventually stops in contact with and pressing against the disk. Thus, the transducing head contacts the recording surface whenever the disk is stationary, accelerated from a stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

It is considered desirable during reading and recording operations to maintain each transducing head as close to its associated recording surface as possible, i.e., to minimize the flying height of the head. This objective becomes particularly significant as the areal recording density increases. The areal density (Mbits/in$^2$) is the recording density per unit area and is equal to the track density (TPI) in terms of tracks per inch times (x) the linear density (BPI) in terms of bits per inch. Thus, a smooth recording surface is preferred, as well as a smooth opposing surface of the associated transducing head, thereby permitting the head and the disk to be positioned in closer proximity with an attendant increase in predictability and consistent behavior of the air bearing supporting the head. However, another factor operates against this objective. If the head surface and recording surface are too flat, the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

In order to satisfy these competing objectives, the recording surfaces of magnetic disks are conventionally provided with a roughened surface to reduce the head/disk friction by techniques referred to as "texturing." Conventional texturing techniques involve polishing the surface of a disk substrate to provide a texture thereon prior to subsequent deposition of coatings, such as an underlayer, magnetic layer, carbon overcoat and lubricant topcoat, wherein the textured surface on the substrate is reproduced on the surface of the magnetic disk.

A typical longitudinal recording medium is depicted in FIG. 1 and comprises a substrate 10, typically aluminum (Al) or an Al alloy, such as an aluminum-magnesium (Al—Mg)-alloy, plated with a layer of amorphous nickel-phosphorus (NiP). Alternative substrates include glass, ceramic, glass-ceramic materials and graphite. Substrate 10 typically contains sequentially deposited on each side thereof a chromium (Cr) or Cr-alloy underlayer 11, 11', a cobalt (Co) base alloy magnetic layer 12, 12', a protective overcoat 13, 13', typically containing carbon, and a lubricant topcoat 14, 14'. Cr underlayer 11, 11' can be applied as a composite comprising a plurality of sub-underlayers 11A, 11A'. Cr underlayer 11, 11', Co base magnetic alloy layer 12, 12' and protective overcoat 13, 13' are typically sputter deposited in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface to serve as a landing zone.

Increasingly high density and large-capacity magnetic disks require smaller flying heights, i.e., the distance by which the head floats above the surface of the disk in the CSS drive. The requirement to further reduce the flying height of the head imposed by increasingly higher recording density and capacity render it particularly difficult to accurately control texturing to avoid head crash.

Conventional techniques for providing a disk substrate with a textured surface comprise a mechanical operation, such as polishing. See, for example, Nakamura et al., U.S. Pat. No. 5,202,810. Conventional mechanical texturing techniques are attendant with numerous disadvantages. For example, it is extremely difficult to provide a clean textured surface due to debris formed by mechanical abrasions. Moreover, the surface inevitably becomes scratched during mechanical operations, which contributes to poor glide characteristics and higher defects. In addition, various desirable substrates are difficult to process by mechanical texturing. This undesirably limiting facet of mechanical texturing, virtually excludes the use of many inexpensive substrates as well as conductive graphite substrates which facilitate achieving high coercivities.

An alternative to mechanical texturing involves the use of lasers to form a landing zone. See, for example, Ranjan et al., U.S. Pat. No. 5,062,021. Another alternative to mechanical texturing is disclosed by Lal et al., U.S. Pat. No. 5,166,006, and involves chemical etching.

In U.S. patent application Ser. No. 08/608,072 filed on Feb. 28, 1996, now U.S. Pat. No. 5,718,811, a magnetic recording medium is disclosed which has a textured surface formed by sputtering a metallic layer, such as titanium or a titanium alloy, on a non-magnetic substrate, inclusive of a glass, glass-ceramics materials and NiP chemically plated Al—Mg alloy substrates. It has, however, been found difficult to produce a magnetic recording medium having a suitably high coercivity increasing Hr have not received significant attention. For example, prior efforts in this area have involved high precision photolithographic techniques, which are extremely time consuming and expensive. Accordingly, large volume production is virtually impossible.

The requirements for high areal recording density impose increasingly greater requirements on thin film magnetic Iii recording media in terms of coercivity, remanent squareness, low medium noise and narrow track recording performance. It is extremely difficult to produce a magnetic recording medium satisfying such demanding requirements, particularly a high density magnetic rigid disk medium for longitudinal recording.

The linear recording density can be increased by increasing the coercivity of the magnetic recording medium. However, this objective can only be accomplished by decreasing the medium noise, as by maintaining very fine magnetically noncoupled grains. Medium noise is a dominant factor restricting increased recording density of high density magnetic hard disk drives. Medium noise in thin films is attributed primarily to inhomogeneous grain size and intergranular exchange coupling. Therefore, in order to increase linear density, medium noise must be minimized by suitable microstructure control.

It is recognized that the relevant magnetic properties, such as remanent coercivity (Hr), magnetic remanence (Mr) and coercive squareness (S*), which are critical to the performance of a magnetic alloy thin film, depend primarily on the microstructure of the magnetic layer which, in turn, is influenced by the underlayer on which it is deposited. Conventional underlayers include Cr, molybdenum (Mo), tungsten (W), titanium (Ti), chromium-vanadium (CrV) as well as Cr alloyed with various substitutional elements. It is recognized that underlayers having a fine grain structure are highly desirable, particularly for growing fine grains of hexagonal close packed (HCP) magnetic Co or Co alloy layers deposited thereon.

In order to satisfy the ever increasing needs for high data storage capacity, it is necessary to manufacture magnetic recording media exhibiting higher Hr and lower media noise i.e., high SNR. Higher Hr effectively narrows the PW50 (pulse width at half maximum) and enables a reduction in the bit length for higher recording density. Micromagnetic studies have been conducted over the past several years to increase Hr and reduce media noise. It is recognized that Hr increases and media noise decreases when magnetic grain interactions are reduced. Since media noise predominately arises from exchange and magnetostatic interactions among magnetic grains, an effective way to suppress such factors is to separate the magnetic grains either physically or chemically, i.e., segregate. Earlier efforts by researchers in this area have concentrated primarily on the magnetic layer and the underlayers. However, there are limits as to the manner in which such underlayer and magnetic layer can be grown.

In the past, substrate treatment or substrate related approaches to ultimately separate or segregate the magnetic grains to reduce exchange and magnetostatic interactions for increasing Hr have not received significant attention. For example, prior efforts in this area have involved high precision photolithographic techniques, which are extremely time consuming and expensive. Accordingly, large volume production is virtually impossible.

Application Ser. No. 08/699,759, filed on Aug. 20, 1996, now U.S. Pat. No. 5,866,227, discloses that Cr films deposited on surface oxidized NiP layers experience smaller grains than Cr films deposited on non-oxidized NiP layers. Application Ser. No. 08/586,529, filed on Jan. 16, 1996, now U.S. Pat. No. 5,733,370, discloses a method of depositing Cr films on surface oxidized NiP films, wherein the deposited Cr films exhibit a (200)—dominant crystallographic orientation.

In Application Ser. No. 08/945,084 filed on Oct. 17, 1997, now U.S. Pat. No. 6,010,795, a magnetic recording medium having high coercivity is disclosed, which magnetic recording medium comprises a seedlayer having an oxidized surface formed on a non-magnetic substrate, a chromium-containing sub-underlayer on the oxidized surface of the seedlayer, a nickel-aluminum or iron-aluminum underlayer, a chromium-containing intermediate layer on the underlayer and a magnetic layer on the intermediate layer.

Application Ser. No. 09/043,610 filed on Mar. 19, 1998, now U.S. Pat. No. 6,218,028 discloses a magnetic recording medium comprising a sputter textured layer.

In applications Ser. Nos. 08/972,229 filed on Nov. 17, 1997 now U.S. Pat. No. 6,021.032, and Ser. No. 08/955,448 filed on Oct. 21, 1997, now U.S. Pat. No. 6,207,926 methods are disclosed for employing a laser beam to texture a data zone.

U.S. Pat. No. 5,470,636, issued to Wakui et al. on Nov. 28, 1995, discloses the formation of a landing zone by anodizing an Al substrate or Al layer on a substrate, filing the resulting pores with a non-magnetic material extending above the anodized surface and treating the anodized layer with a fluorine reagent, acid or base.

There exists a continuing need for magnetic recording media suitable for high areal recording density exhibiting high Hr, high SNR and high S* and improved flying characteristics. There also exists a continuing need for cost effective, efficient methodology for manufacturing high areal density magnetic recording media exhibiting high Hr, SNR and S* and improved flying characteristics.

DISCLOSURE OF THE INVENTION

An advantage of the present invention is a magnetic recording medium suitable for high areal density longitudinal magnetic recording which exhibits low medium noise, high Hr, high S* and improved flying characteristics.

Another advantage of the present invention is a cost effective, efficient method of manufacturing a magnetic recording medium suitable for high areal density longitudinal magnetic recording which exhibits low medium noise, high Hr, high S* and improved flying characteristics.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to the present invention, the foregoing and other advantages are achieved in part by a magnetic recording medium comprising: a non-magnetic substrate; a layer comprising Al or an Al alloy on the substrate, the Al or Al alloy having a substantially uniform pattern thereon; and a magnetic layer; wherein, the pattern is substantially replicated on the magnetic layer to form a data zone.

Another aspect of the present invention is a method of manufacturing a magnetic recording medium, the method comprising: forming a layer of Al or an Al alloy on a non-magnetic substrate; forming a substantially uniform pattern on the Al or Al alloy layer; and forming a magnetic layer; wherein, the pattern is substantially replicated on the magnetic layer to form a data zone.

Embodiments of the present invention comprise anodizing the Al or Al alloy layer to form a substantially uniform honeycomb pattern comprising substantially hexagonal cells of Al oxide. Embodiments of the present invention further comprise texturing the surface of the substrate to form a textured area which is substantially replicated on subsequently deposited layers, including the magnetic layer, to form a recording data zone.

Additional advantages of the present invention will become readily apparent to those skilled in this art from the following detailed description, wherein the embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

BRIEF DESCRIPTION OF DRAWINGS

FIG. 3 is an atomic force microscope (AFM) image of a NiP/Al substrate before and after anodizing in accordance with an embodiment of the present invention.

DESCRIPTION OF THE INVENTION

Figure 1:
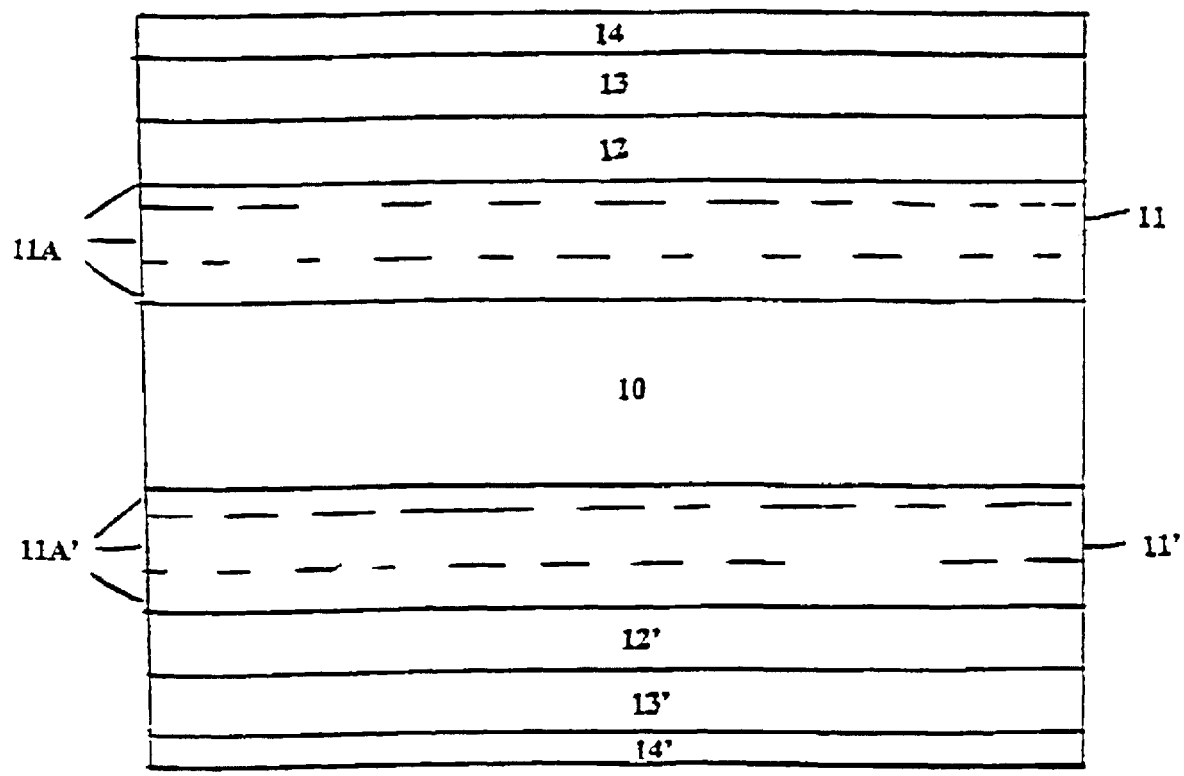
FIG. 1 schematically depicts a conventional magnetic recording medium structure.

The present invention addresses the problem of increasing the data storage capacity of magnetic recording media by increasing the Hr and lowering media noise. The increased Hr narrows the pulse width and enables a reduction of the bit length for increased recording density. Lower media noise generates a higher SNR. Embodiments of the present invention achieve the foregoing objectives by a physically segregating the magnetic grains of the magnetic layer. Such physical segregation of magnetic grains is achieved by forming a pattern on the substrate which initiates magnetic film growth in patterns. Such patterns minimize the irregularity of grain growth and narrow the magnetic grain unit's distribution, thereby reducing the origins of zigzag transitions, consequently suppressing magnetic grain interactions and improving SNR.

Embodiments of the present invention comprise forming a continuous film on any of various conventional non-magnetic substrates. The continuous film is patterned to provide a substantially uniform matrix for thin film growth, which matrix is substantially replicated in subsequently deposited layers, including the magnetic layer, to form a data zone. In other words, the uniform pattern formed on the substrate in accordance with embodiments of the present invention serves as a template for films subsequently deposited thereon, e.g. the underlayer and magnetic layer. Thus, magnetic unit clusters are replicated in accordance with the substrate pattern and, hence, magnetic grain clusters are separated by the pattern boundaries. In this way, grain interactions are minimized and SNR increased.

In accordance with embodiments of the present invention, an Al or Al alloy is sputter deposited on a non-magnetic substrate, such as a NiP plated Al or Al alloy substrate, or a glass, ceramic, or glass-ceramic substrate. The Al or Al alloy film can be sputter deposited to a thickness of about 50 Å to about 5000 Å, e.g., about 500 Å to about 1500 Å. In accordance with embodiments of the present invention, a substantially uniform pattern is formed on the sputter deposited Al or Al alloy film to serve as a template such that the magnetic grain clusters of the subsequently deposited magnetic layer are separated by the pattern boundaries. The sputter deposited Al or Al alloy film is anodized to form a pattern comprising aluminum oxide, such as a substantially honeycomb pattern. Anodization can be effected in any conventional manner, as by treatment with a solution of hydrogen phosphate ($H_3PO_4$) of about 1% to about 10%, e.g. about 4%, at about 1 to about 15 $mA/cm^2$, e.g. about 5 $mA/cm^2$, at room temperature for up to about 1 hour, e.g. about 10 minutes. The resulting substantially honeycomb pattern comprises substantially hexagonal cells of aluminum oxide. Such substantially hexagonal cells serve as a suitable template for the subsequently deposited magnetic layer such that epitaxial growth is effective to produce a desired hexagonal close packed (HCP) crystal structure. Moreover, the boundaries of the substantially hexagonal cells, due to substantial replication in the magnetic layer, serve to separate the magnetic grain clusters thereby minimizing grain interactions and improving SNR.

Subsequent to anodization, the magnetic recording medium is completed by depositing an underlayer and magnetic layer on the anodized surface, replicating the patterns on the substrate. For example, a seedlayer, such as nickel aluminum (NiAl) is deposited on the anodized Al or Al alloy layer. It is believed that the cells are not completely filled. An underlayer, such as CrV, is sputter deposited on the NiAl seedlayer, and a magnetic layer, such as a cobalt-chromium-platinum-tantalum (CoCrPtTa) alloy layer is sputter deposited on the underlayer. A protective overcoat, such as a carbon-containing protective overcoat, is sputter deposited on the magnetic layer and a lubricant topcoat is formed on the protective overcoat. The layers can be sputter deposited in order to optimize magnetic properties, as by employing a base pressure of $2 \times 10^{-7}$ Torr with a substrate temperature of about 200° C. to 300° C. and a substrate bias at about −250 volts, employing a sputtering power density of between $2W/cm^2$ to $30W/cm^2$ utilizing a sputtering gas flow rate of about 15 sccm.

Figure 2:
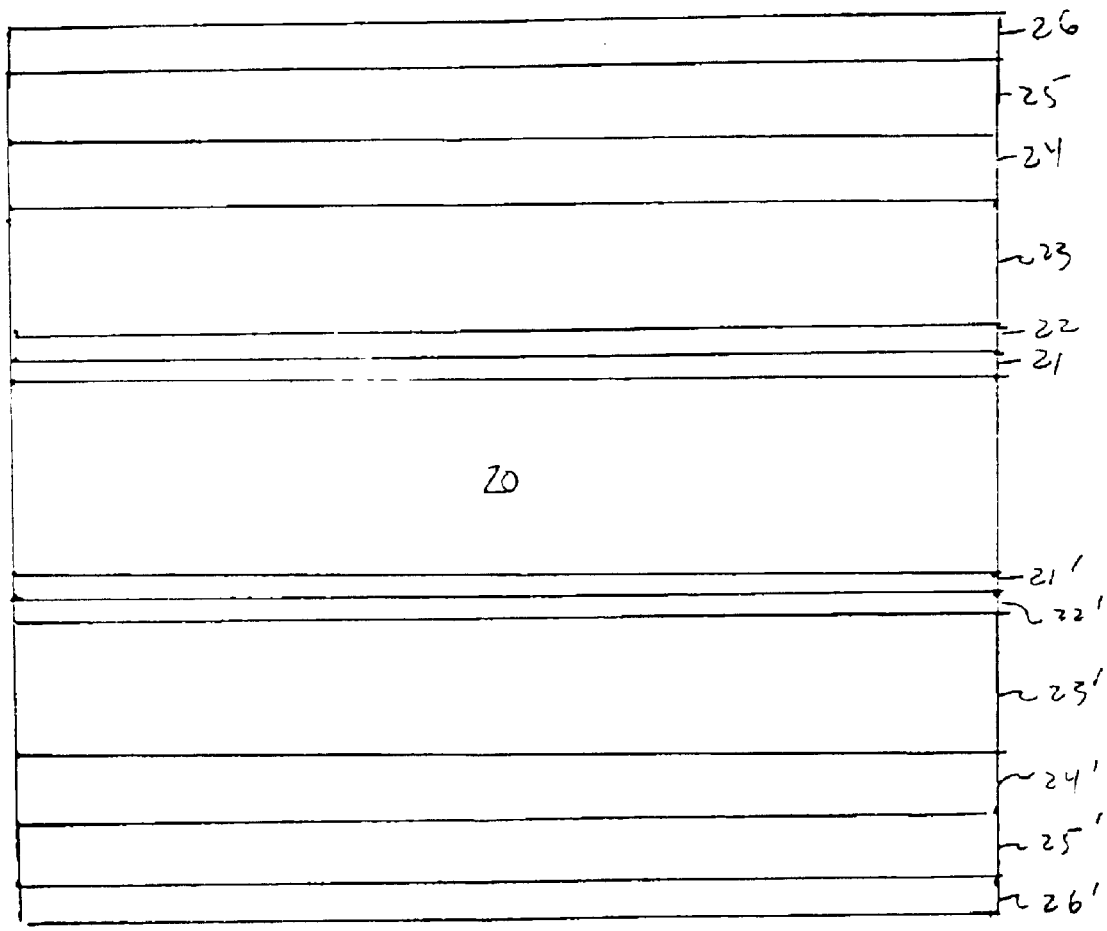
FIG. 2 schematically depicts a magnetic recording medium structure in accordance with the present invention.

An embodiment of the present invention is schematically illustrated in FIG. 2 and comprises a non-magnetic substrate 20, such as NiP plated Al. On each side of substrate 20 is sequentially formed an anodized sputter deposited Al layer 21, 21' comprising a substantially uniform honeycomb pattern of substantially hexagonal cells of aluminum oxide. Seedlayer 22, 22', such as NiAl, is sputter deposited on the honeycomb pattern. An underlayer 23, 23', such as CrV, is sputter deposited on seedlayer 22, 22', and a magnetic layer 24, 24', such as CoCrPtTa, is sputter deposited on underlayer 23, 23'. During epitaxial growth, an HCP pattern is formed substantially following the template of the patterned layer 21, 21', such that the patterned boundaries separate the magnetic grain clusters, thereby minimizing grain interactions and improving SNR. A conventional protective overcoat 25, 25', such as a carbon-containing protective overcoat, is sputter deposited on the magnetic layer 24, 24'and a conventional lubricant topcoat 26, 26' formed thereon.

EXAMPLE

A magnetic recording medium in accordance with the present invention was made by sputter depositing an Al layer on an NiP/Al substrate and anodizing the Al layer to form a substantially honeycomb Al oxide pattern comprising substantially hexagonal cells having a depth of about 500 Å and a diameter of about 500 Å, suitable for magnetic recording bit size scales. A NiAl seedlayer was deposited on the anodized Al layer, a CrV underlayer was deposited on the NiAl seedlayer, and a CoCrPtTa magnetic layer was deposited on the oft CrV underlayer. A carbon-containing protective overcoat was deposited on the CoCrPtTa layer. The Al layer was anodized in a 4% $H_3PO_4$ solution and the results of anodization are shown in FIG. 3, the left hand portion of FIG. 3 illustrating the Al layer before anodization and right hand portion comprising the honeycomb structure subsequent to anodization.

A comparison (regular) magnetic recording medium was made employing substantially the same layers and substantially the same deposition conditions as in forming the magnetic recording medium representative of the present invention, except that an Al layer was not sputter deposited on the substrate and anodized. The magnetic properties of both media were tested employing a non-destructive rotating disk magnetometer. Recording characteristics and media noise was measured at a linear density of 240 kfci (kiloflux changes per inch) employing a Guzik 1601 tester with a magnetorestive (MR) head having a 0.35 $\mu$in gap length and flying at a nominal height of 2.1 $\mu$in.

Figure 4A:
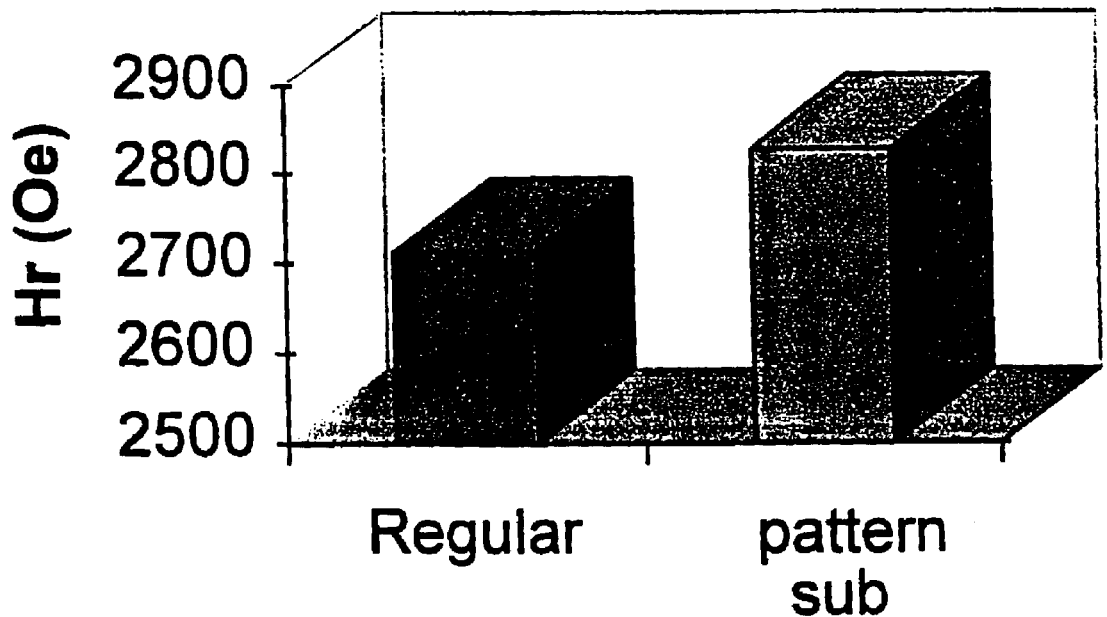
FIGS. 4A and 4B show the Hr and SNR, respectively, of an embodiment of the present invention vis-à-vis a conventional magnetic recording medium.
Figure 4B:
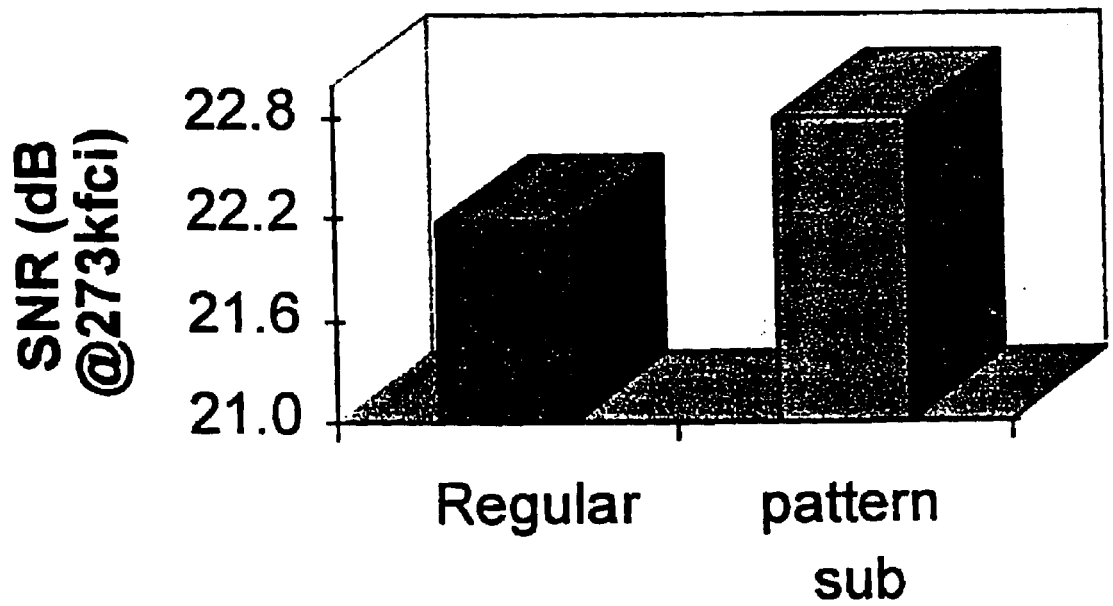

The test results are depicted in FIGS. 4A and 4B. FIG. 4A shows the magnetic properties of the comparison (regular) medium and the medium in accordance with the present invention (patterned sub). It is apparent from FIG. 4A that the use of a pattern Al layer on the substrate resulted in an increase in Hr.

FIG. 4B illustrates that the magnetic recording medium in accordance with the present invention exhibits an improvement in SNR of about 0.5 to about 1 dB vis-à-vis the comparison (regular) magnetic recording medium.

In accordance with the present invention, a patterned anodized Al oxide layer is formed on a non-magnetic substrate for increased areal recording density. The anodized pattern can be formed on any non-magnetic substrate, and typically exhibits a substantially hexagonal honeycomb structure comprising a single hexagonal unit cell ranging from about 50 Å to about 5000 Å in diameter and about 50 Å to about 10,000 Å in depth. Conventional magnetron sputtering techniques can be employed to produce magnetic recording media in accordance with the present invention. Accordingly, the present invention can be easily integrated into existing production facilities. The present invention enables the formation of magnetic recording media suitable for high areal density recording having improved Hr, improved SNR and S*. The present invention also achieves a significant increase in SNR by effecting separation of magnetic grain cells by the pattern boundaries, thereby suppressing magnetic interaction. The present invention enables production of any of various types of magnetic recording media, particularly magnetic recording media, such as thin film disks having improved flying heights.

Only certain embodiments of the present invention and but a few examples of its versatility are shown and described in the present disclosure. It is to be understood that the present invention is capable of use in various other combinations and environments and is capable of changes and modifications within the scope of the inventive concept as expressed herein.

What is claimed is:

1. A magnetic recording medium comprising:
    a non-magnetic substrate;
    a layer comprising aluminum (Al) or an Al alloy on the substrate, the layer having a substantially uniform pattern thereon;
    an underlayer over the layer comprising Al or an Al alloy; and
    a magnetic layer; wherein,
        the pattern is substantially replicated on the magnetic layer to form a data zone such that magnetic grain clusters of the magnetic layer are separated by pattern boundaries, thereby minimizing grain interactions and increasing SNR.

2. The magnetic recording medium according to claim 1, further comprising a laser textured landing zone.

3. The magnetic recording medium according to claim 1, wherein the pattern comprises a substantially honeycomb pattern of aluminum oxide formed by anodization.

4. The magnetic recording medium according to claim 3, wherein the honeycomb pattern comprises substantially hexagonal cells.

5. The magnetic recording medium according to claim 4, wherein the cells have a diameter of about 50 Å to about 5000 Å and a depth of about 50 Å to about 10,000 Å.

6. The magnetic recording medium according to claim 1, wherein the Al or Al alloy layer has a thickness of about 50 Å to about 5000 Å.

7. The magnetic recording medium according to claim 6, wherein the Al or Al alloy layer has a thickness of about 500 Å to about 1500 Å.

8. The magnetic recording medium according to claim 1, further comprising:
    a seedlayer directly on the patterned Al or Al alloy layer;
    the underlayer on the seedlayer and;
    the magnetic layer on the underlayer.

9. The magnetic recording medium according to claim 8, wherein:
    the substrate comprises a nickel phosphorus plated Al or Al alloy;
    the seedlayer comprises nickel aluminum;
    the underlayer comprises chromium vanadium; and
    the magnetic layer comprises a cobalt-chromium-platinum-tantalum alloy.

10. The magnetic recording medium according to claim 1, wherein the substrate comprises nickel-phosphorus plated aluminum or aluminum alloy, or a glass, ceramic or glass-ceramic material.

11. A method of manufacturing a magnetic recording medium, the method comprising:

forming a layer of aluminum (Al) or Al alloy on a non-magnetic substrate;

forming a substantially uniform pattern on the Al or Al alloy layer;

forming an underlayer over the layer of Al or Al alloy; and forming a magnetic layer; wherein, the pattern is substantially replicated on the magnetic layer to form a data zone such that magnetic grain clusters of the magnetic layer are separated by pattern boundaries, thereby minimizing grain interactions and increasing SNR.

12. The method according to claim 11, comprising forming the pattern by anodizing the Al or Al alloy layer, wherein the pattern comprises aluminum oxide.

13. The method according to claim 12, comprising anodizing the Al or Al alloy layer to form a substantially honeycomb pattern containing substantially hexagonal cells.

14. The method according to claim 13, wherein the cells have a diameter of about 50 Å to about 5000 Å and a depth of about 50 Å to 10,000 Å.

15. The method according to claim 13, comprising anodizing with a solution comprising about 1% to about 15% hydrogen phosphate for about 1 to about 15 minutes.

16. The method according to claim 11, comprising sputter depositing the Al or Al alloy layer to a thickness of about 50 Å to about 5000 Å.

17. The method according to claim 16, comprising sputter depositing the Al or Al alloy to a thickness of about 500 Å to about 1500 Å.

18. The method according to claim 11, comprising laser texturing the substrate to form a textured area which is substantially replicated on the magnetic layer to form a landing zone.

19. The method according to claim 11, comprising:

sputtering depositing a seedlayer directly on the patterned Al or Al alloy layer;

sputter depositing the underlayer on the seedlayer; and sputter depositing the magnetic layer on the underlayer.

20. The method according to claim 19, wherein:

the substrate comprises nickel-phosphorous plated Al or an Al alloy;

the seedlayer comprises nickel aluminum;

the underlayer comprises chromium vanadium; and the magnetic layer comprises an alloy of cobalt-chromium-platinum-tantalum.

\* \* \* \* \*